US008559364B2

(12) United States Patent
Hwang et al.

(10) Patent No.: US 8,559,364 B2
(45) Date of Patent: Oct. 15, 2013

(54) METHOD AND SYSTEM FOR TRANSMITTING/RECEIVING DATA IN A COMMUNICATION SYSTEM

(75) Inventors: Sung-Soo Hwang, Suwon-si (KR);
Soon-Young Yoon, Seoul (KR);
Yong-Seok Kim, Suwon-si (KR);
Ki-Young Han, Yongin-si (KR);
Keun-Chul Hwang, Seongnam-si (KR);
Joo-Hyun Lee, Suwon-si (KR); June Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1804 days.

(21) Appl. No.: 11/649,733

(22) Filed: Jan. 4, 2007

(65) Prior Publication Data
US 2007/0191015 A1 Aug. 16, 2007

(30) Foreign Application Priority Data
Jan. 4, 2006 (KR) .................. 10-2006-0001116

(51) Int. Cl.
*H04W 80/04* (2009.01)
(52) U.S. Cl.
USPC ........ 370/328; 370/310; 455/422.1; 455/460; 455/524; 455/525
(58) Field of Classification Search
USPC ........ 370/328, 310; 455/422.1, 460, 524, 525
See application file for complete search history.

(56) References Cited

U.S. PATENT DOCUMENTS 7,006,844 B2 * 2/2006 Sarkkinen et al. ............ 455/522
7,016,321 B1 * 3/2006 Park et al. ..................... 370/331
7,239,880 B2 * 7/2007 Shaheen ....................... 455/458
7,260,079 B1 * 8/2007 Chapman et al. ............. 370/338
7,349,371 B2 * 3/2008 Schein et al. ................. 370/329

(Continued)

FOREIGN PATENT DOCUMENTS

EP 1 248 480 10/2002
EP 1 534 035 5/2005

(Continued)

OTHER PUBLICATIONS

Nortel: "Proposal for Methods to Mitigate Inter-cell Interference", R1-050941, 3GPP TSG-RAN1 Meeting #42, Aug. 26, 2005.
Samsung: "Flexible Fractional Frequency Reuse Approach", R1-051341, 3GPP TSG RAN WG1 Meeting #43, Nov. 1, 2005.

*Primary Examiner* — Lester Kincaid
*Assistant Examiner* — Diego Herrera
(74) *Attorney, Agent, or Firm* — The Farrell Law Firm, P.C.

(57) ABSTRACT

A method is provided for transmitting/receiving data in a communication system. The method includes determining, when data to be transmitted to at least one Mobile Station (MS) is generated, a region where an MS that receive the generated data among the at least one MS is located, allocating resources of a data transmission region divided into a first region and a second region to the MS that receive the generated data according to the determination result, including the generated data in a region where the resource is allocated, and including, in a MAP message region, resource allocation information of the region where the data is included and information on an MS that receive the data included in the resource-allocated region, and transmitting, to the MS, a frame including the region in which the generated data is included, and the MAP message region.

38 Claims, 9 Drawing Sheets

(56) References Cited

U.S. PATENT DOCUMENTS

| | | | |
|---|---|---|---|
| 7,376,424 B2 * | 5/2008 | Kim et al. | 455/436 |
| 7,586,874 B2 * | 9/2009 | Rudolf et al. | 370/330 |
| 2002/0071480 A1 * | 6/2002 | Marjelund et al. | 375/141 |
| 2003/0119533 A1 * | 6/2003 | Sarkkinen et al. | 455/500 |
| 2003/0199533 A1 * | 10/2003 | Curry | 514/270 |
| 2004/0235490 A1 * | 11/2004 | Lv | 455/453 |
| 2005/0282550 A1 * | 12/2005 | Cho et al. | 455/447 |
| 2006/0025079 A1 * | 2/2006 | Sutskover et al. | 455/67.11 |
| 2008/0130605 A1 | 6/2008 | Song et al. | |

FOREIGN PATENT DOCUMENTS

| | | |
|---|---|---|
| KR | 1020050030508 | 3/2005 |
| KR | 1020050049299 | 5/2005 |
| KR | 1020050107254 | 11/2005 |
| KR | 1020050114589 | 12/2005 |
| WO | WO 2005/043948 | 5/2005 |

* cited by examiner

METHOD AND SYSTEM FOR TRANSMITTING/RECEIVING DATA IN A COMMUNICATION SYSTEM

PRIORITY

This application claims the benefit under 35 U.S.C. §119 (a) of a Korean Patent Application filed in the Korean Intellectual Property Office on Jan. 4, 2006 and assigned Serial No. 2006-1116, the contents of which are incorporated herein by reference.

BACKGROUND OF THE INVENTION

1. Field of the Invention

The present invention relates generally to a communication system, and in particular, to a data transmission/reception method and system for removing cell interference between neighbor cells in a communication system having a multi-cell structure.

2. Description of the Related Art

In the next generation communication system, active research is being conducted to provide high-speed services having various Qualities of Service (QoS) to users. Particularly, a study is being conducted to support high-speed services that can guarantee mobility and QoS for a Broadband Wireless Access (BWA) communication system such as a Wireless Local Area Network (WLAN) system and a Wireless Metropolitan Area Network (WMAN). An Institute of Electrical and Electronics Engineers (IEEE) 802.16a/d communication system and an IEEE 802.16e communication system are typical BWA communication systems.

The IEEE 802.16a/d communication system and the IEEE 802.16e communication systems employ Orthogonal Frequency Division Multiplexing (OFDM)/Orthogonal Frequency Division Multiple Access (OFDMA) to support a broadband transmission network for physical channels of the WMAN system. The IEEE 802.16a/d communication system currently considers only the state in which a Subscriber Station (SS) is fixed, i.e. the state in which mobility of the SS is never considered, and the single-cell structure. Unlike the IEEE 802.16a/d communication system, the IEEE 802.16e communication system considers mobility of the SS in the IEEE 802.16a communication system, and an SS having the mobility will herein be referred to as a Mobile Station (MS).

In the BWA communication system, because the limited resources, i.e. frequency, code and time slot resources, are shared by a plurality of cells constituting the communication system, interference may occur between the plurality of cells, especially between neighbor cells. The interference between neighbor cells is considerable in a communication system using a frequency reuse factor of 1. More specifically, the use of the frequency reuse factor of 1 increases efficient utilization of the frequency resources, but an MS located in the cell boundary between neighbor cells suffers a considerable decrease in a Carrier-to-Interference and Noise Ratio (CINR) of a signal received from a serving Base Station (BS) that manages the cell where the MS is located. That is, in the communication system using the frequency reuse factor of 1, an MS located in the vicinity of the serving BS may have no difficulty in communicating with the serving BS due to the low interference, but the MS located in the cell boundary suffers interference from a neighbor BS that manages a neighbor cell, decreasing the system performance.

In order to remove the interference between neighbor cells, the MS improves a received CINR from the serving BS using an interference remover in a downlink interval, and the serving BS improves a received CINR from the MS using an interference remover in an uplink interval, thereby improving the system performance. However, the scheme of improving the system performance using the interference remover cannot realize significant improvement of the system performance, because the interference canceller may not accurately cancel the interference signals or may not correctly restore the signals received from the serving BS.

FIG. 1 illustrates a configuration of a conventional BWA communication system.

Referring to FIG. 1, the BWA communication system has a multi-cell structure, i.e. has a cell1 110 and a cell2 120, and includes a BS1 111 and a BS2 121 that manage the cells 110 and 120, respectively, and an MS 113 that is located in cell1 110 and receives a communication service from BS1 111. For convenience, signal exchanges between the BSs 111 and 121 and the MS 113 are assumed to be performed through a first channel h1 and a second channel h2, respectively, using OFDM/OFDMA.

The MS 113 is located in the boundary of cell1 110, and BS1 111 transmits data to MS 113 located in cell 110 through a frequency region (A-1) 151. The BS2 121 that manages cell2 120, which is a neighbor cell of MS 113, transmits data to MSs located in cell2 120 through a frequency region (B-1) 161 and a frequency region (B-2) 163. In this case, the MS 113 located in the boundary of cell1 110 can receive the interference caused by the data transmitted by BS2 121, which is a neighbor BS, while receiving data from BS1 111, which is the serving BS, through frequency region (A-1) 151.

In other words, there is an overlapping region where frequency region (A-1) 151 allocated to MS 113 by BS1 111 and frequency regions (B-1) 161 and (B-2) 163 allocated to the MSs located in cell2 120 by BS2 121 overlap each other. The overlapping region is an interference region for MS 113 located in the boundary of cell1 110. Because of the presence of the interference region, if BS2 121 of cell2 120 transmits data through frequency regions (B-1) 161 and (B-2) 163 using the same time-frequency resources as those of BS1 111 while MS 113 is receiving data from BS1 111 through frequency region (A-1) 151, MS 113 located in the boundary of cell1 110 decreases in the received CINR, causing a decrease in reception performance of the MS 113.

In order to prevent the decrease in the CINR due to the interference of cell2 120, MS 113 removes the interference using the interference remover as described above. However, because BS1 111 and BS2 121 allocate resources independently of each other, the interference remover may not accurately remove the interference signals or may not correctly restore the signals received from the serving BS1 111. Therefore, it is difficult to expect noticeable improvement of the system performance.

More specifically, if BS2 121 of cell2 120 transmits data through frequency regions (B-1) 161 and (B-2) 163 while MS 113 is receiving data from BS1 111, or a serving BS, through frequency region (A-1) 151, the data transmitted by BS2 121 serves as interference to MS 113. In order to remove the interference, MS 113 should have information on the overlapping region between frequency region (A-1) 151, and frequency regions (B-1) 161 and (B-2) 163, i.e. information on the interference region. In addition, MS 113 should have information on a Modulation and Coding Scheme (MCS) level of the data transmitted through frequency region (B-1) 161 and an MCS level of the data transmitted through frequency region (B-2) 163, and should also have information on channel h2 of cell2 120.

That is, in order to remove the inter-cell interference of cell2 120, the MS 113 should estimate the channel of cell2

120 using a pilot received from BS2 121. The need for the information by MS 113 for the inter-cell interference removal acts as a heavy load to MS 113, decreasing the system performance. When the MS 113 has a plurality of neighbor cells, the decrease in the system performance can be more considerable.

SUMMARY OF THE INVENTION

The preferred embodiments of the present invention are disclosed to address at least the problems and/or disadvantages and to provide at least the advantages described below. Accordingly, the preferred embodiments of the present invention are disclosed to provide a method and system for transmitting and receiving data in a communication system.

An object of the present invention is to provide a method and a system for transmitting and receiving data in a communication system having a multi-cell structure.

An object of the present invention is to provide a data transmission/reception method and system for removing inter-cell interference in a communication system having a multi-cell structure.

According to the present invention, there is provided a method for transmitting/receiving data in a communication system. The method includes determining, when data to be transmitted to at least one Mobile Station (MS) is generated, a region where an MS that receive the generated data among the at least one MS is located, allocating resources of a data transmission region divided into a first region and a second region to the MS that receive the generated data according to the determination result, including the generated data in a region where the resource is allocated, and including, in a MAP message region, resource allocation information of the region where the data is included and information on an MS that receive the data included in the resource-allocated region, and transmitting, to the MS, a frame including the region in which the generated data is included, and the MAP message region.

According to the present invention, there is provided a method for transmitting/receiving data in a communication system. The method includes receiving, from a Base Station (BS) of a serving cell where a Mobile Station (MS) is currently located, a frame having a data transmission region that is divided into a first region and a second region, detecting information included in a preamble region and a MAP message region of the received frame, and determining a region where the MS is located depending on the detected information, and detecting data included in a corresponding region out of the first region and the second region according to the determination result.

According to the present invention, there is provided a system for transmitting/receiving data in a communication system. The system includes a Base Station (BS) for determining, when data to be transmitted to at least one Mobile Station (MS) is generated, a region where an MS that receive the generated data among the at least one MS is located, allocating resource of a data transmission region divided into a first region and a second region to the MS that receive the data according to the determination result, including the generated data in a region where the resource is allocated, including, in a MAP message region, resource allocation information of the region where the data is included and information on an MS that receive the data included in the resource-allocated region, and transmitting, to the MS, a frame including the region in which the generated data is included, and the MAP message region, and an MS for receiving a frame having a data transmission region that is divided into a first region and a second region, from a BS of a serving cell where the MS is currently located, detecting information included in a preamble region and a MAP message region of the received frame, determining a region where the MS is located depending on the detected information, and detecting data included in a corresponding region out of the first region and the second region according to the determination result.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
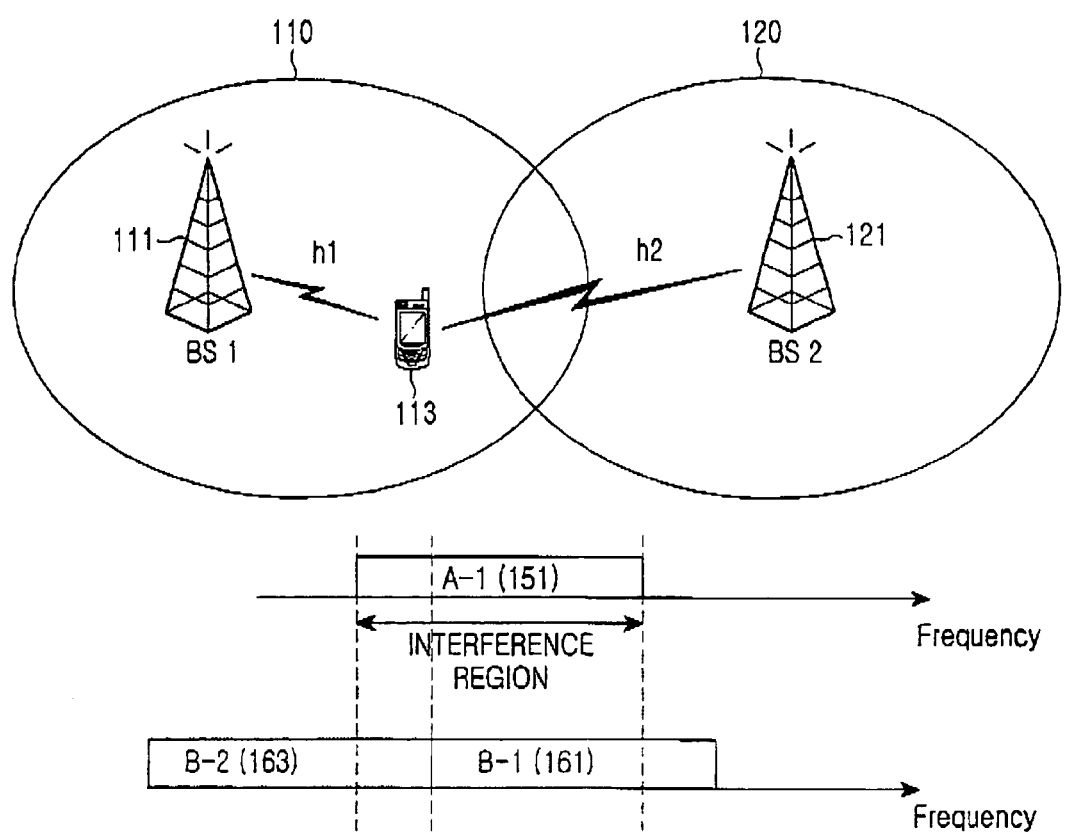
FIG. 1 illustrates a configuration of a conventional BWA communication system.

Preferred embodiments of the present invention will now be described in detail with reference to the annexed drawings. Throughout the drawings, the same drawing reference numerals will be understood to refer to the same elements, features and structures. In the following description, a detailed description of known functions and configurations incorporated herein has been omitted for the sake of clarity and conciseness.

The present invention provides a method and system for transmitting and receiving data in, for example, an Institute of Electrical and Electronics Engineers (IEEE) 802.16 communication system, which is a Broadband Wireless Access (BWA) communication system. Although preferred embodiments of the present invention will be described herein with reference to the IEEE 802.16 communication system employing Orthogonal Frequency Division Multiplexing (OFDM)/Orthogonal Frequency Division Multiple Access (OFDMA), by way of example, the data transmission/reception method and system disclosed in the present invention can also be applied to other communication systems.

In addition, the present invention provides a method and system for data transmission/reception between a transmitter, for example, a Base Station (BS) that manages each of a plurality of cells, and a receiver, for example, a Mobile Station (MS) that receives a communication service from the transmitter, in a communication system having a multi-cell structure. Herein, the BS allocates resources according to feedback information, for example, a Carrier-to-Interference and Noise Ratio (CINR), of a signal received from the BS, strength of a received signal, MS information, and the like, transmitted from the MS, and exchanges data with the MS through the allocated resources.

The present invention provides a resource allocation method and system for removing inter-cell interference in a communication system having a multi-cell structure, and a method and system for data transmission/reception between a BS and an MS through the allocated resources. In the communication system, a BS divides resources for data transmission, i.e. a data transmission region, into a first region, for example, non-interference region, and a second region, for example, interference region. The BS allocates resources of the non-interference region, i.e. the first region, or resources of the interference region, i.e. the second region, to an MS according to feedback information transmitted from the MS. The BS exchanges data with the MS through the allocated resources. During the data exchange, the MS removes interference signals due to cell interference.

In addition, the present invention provides a frame structure with which an MS located in an arbitrary cell, e.g. serving cell, among the plurality of cells can simply remove cell interference from a neighbor cell of the arbitrary cell while receiving a communication service from a serving BS that manages the arbitrary cell. That is, the BS divides a data transmission region of the frame into a non-interference region, i.e. the first region, and an interference region, i.e. the second region, allocates resources of the interference region or resources of the non-interference region to an MS according to feedback information from the MS, and exchanges data with the MS through the allocated resources.

Meanwhile, the IEEE 802.16 communication system, according to the present invention has a frame structure, and the communication system allows a BS to efficiently allocate resources of each frame to MSs and transmit the resource allocate information to the MSs through a MAP message. Herein, a MAP message used for transmitting DownLink (DL) resource allocation information is referred to as a DL-MAP message, and a MAP message used for transmitting UpLink (UL) resource allocation information is referred to as a UL-MAP message. If the BS transmits the downlink resource allocation information and the uplink resource allocation information through the DL-MAP message and the UL-MAP message in this manner, MSs can decode the DL-MAP message and the UL-MAP message transmitted by the BS, and detect allocation positions of the resources allocated to them, and control information of the data that the MSs should receive. The MSs can receive and transmit data through a downlink and an uplink by detecting the resource allocation positions and the control information.

Figure 2A:
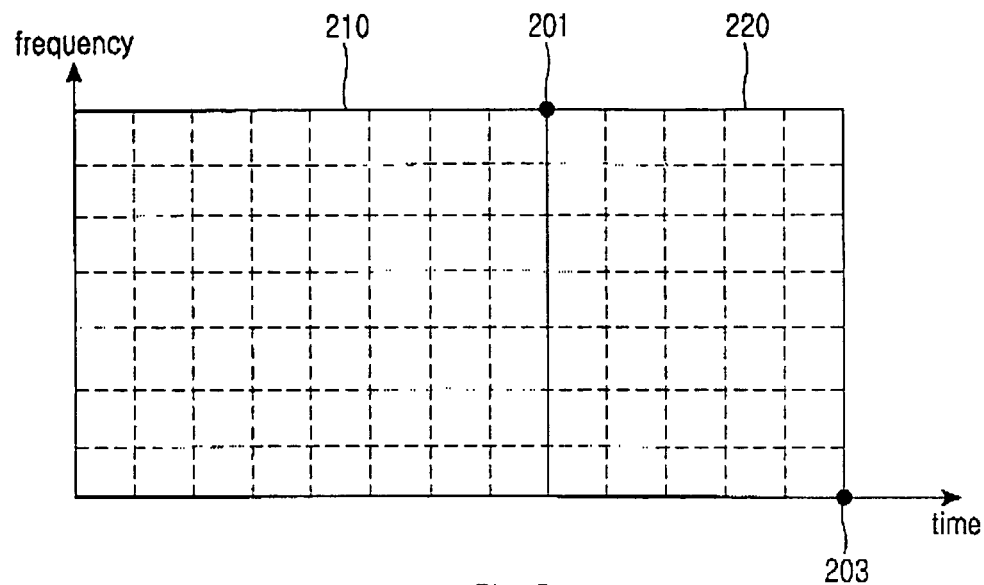
FIGS. 2A and 2B illustrate frame structures in a communication system according to the present invention.
Figure 2B:
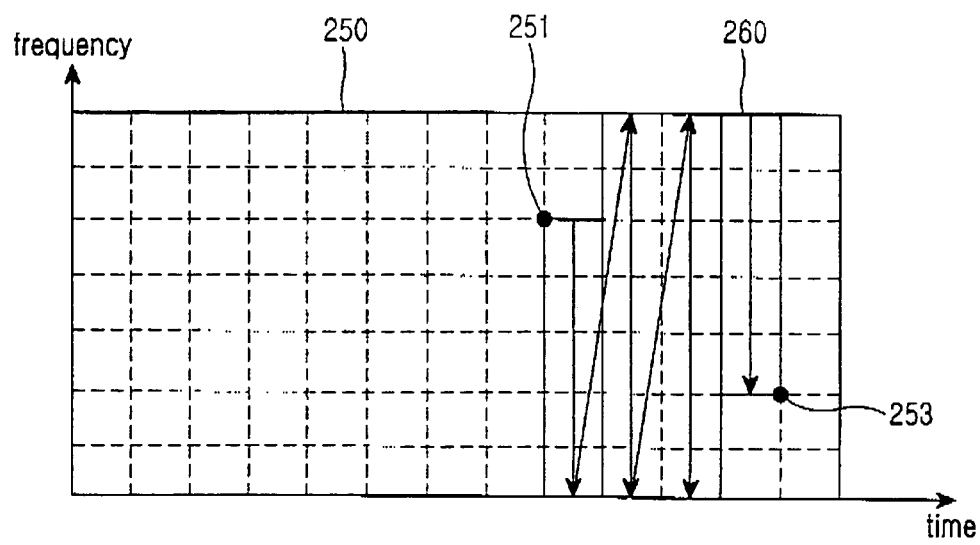

FIGS. 2A and 2B illustrate frame structures in a communication system according to the present invention, a data transmission region of which is divided into a non-interference region, i.e. first region, and an interference region, i.e. second region. Specifically, FIG. 2A illustrates a frame structure that is divided into a non-interference region and an interference region in a rectangular form, and FIG. 2B illustrates a frame structure that is divided into a non-interference region and an interference region according to a predetermined pattern.

Referring to FIGS. 2A and 2B, the frames for the communication system have a two-dimensional structure by a frequency region and a time region, and data transmission regions of the frames are divided into non-interference regions 210 and 250, and interference regions 220 and 260. If the communication system has a multi-cell structure, the interference regions 220 and 260 are divided as the same regions by BSs that manage the multiple cells. That is, the interference regions 220 and 260 of all frames of the multiple cells have the same sizes and positions.

More specifically, the interference regions 220 and 260 are defined by start positions 201 and 251 and end positions 203 and 253, and in all frames for the multiple cells, the start positions 201 and 251 and the end positions 203 and 253 of the interference regions 220 and 260 are identical. In addition, the interference regions 220 and 260 are divided into specific unit regions for resource allocation to MSs located in an interference region of the cell, for example, to MSs which are located in the cell boundary and receive cell interference from a neighbor cell, and the specific unit region is allocated to one MS located in an interference region in each cell.

Herein, the "specific unit region" refers to a preset unit composed of more than one slot, more than one tile, or more than one symbol, and in the IEEE 802.16 communication system, more than one tile that has been previously set by a user according to communication environment for data transmission to one MS can be formed as the specific unit region. In addition, the interference regions are divided into the specific unit regions in all frames for the multiple cells, such that the specific unit regions have the same sizes and positions in the interference regions having the same sizes and positions, i.e. start positions and end positions of the specific unit regions are identical.

The divided specific unit regions are allocated to MSs located in the interference regions, and one or a plurality of unit regions are allocated to one MS. For convenience, it will be assumed herein that one unit region is allocated to one MS. The specific unit cells can be sequentially allocated according to channel status information between each cell and its MSs, or can be randomly allocated. In addition, the specific unit cells can be allocated according to a preset allocation scheme between cells, or according to load information of a BS that manages a neighbor cell. Herein, Modulation and Coding Scheme (MCS) level and repetition for each of the specific unit regions are identical in all frames of the multiple cells. That is, the specific unit regions have the same MCS level.

Once IDentifiers (IDs) of the cells in the communication system having a multi-cell structure are determined, BSs that manage the multiple cells divide the frames into non-interference regions 210 and 250 and interference regions 220 and 260, and the interference regions 220 and 260 are defined as described above. Because all frames of the multiple cells have the same structure, all the frames for the multiple cells have one of the structure of FIG. 2A and the structure of FIG. 2B.

Figure 3A:
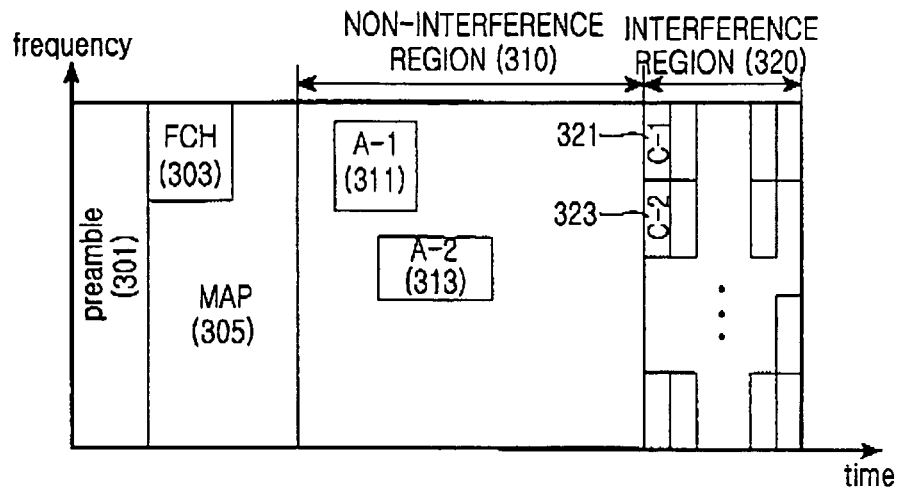
FIGS. 3A and 3B illustrate frame structures in a BWA communication system having a multi-cell structure according to the present invention.
Figure 3B:
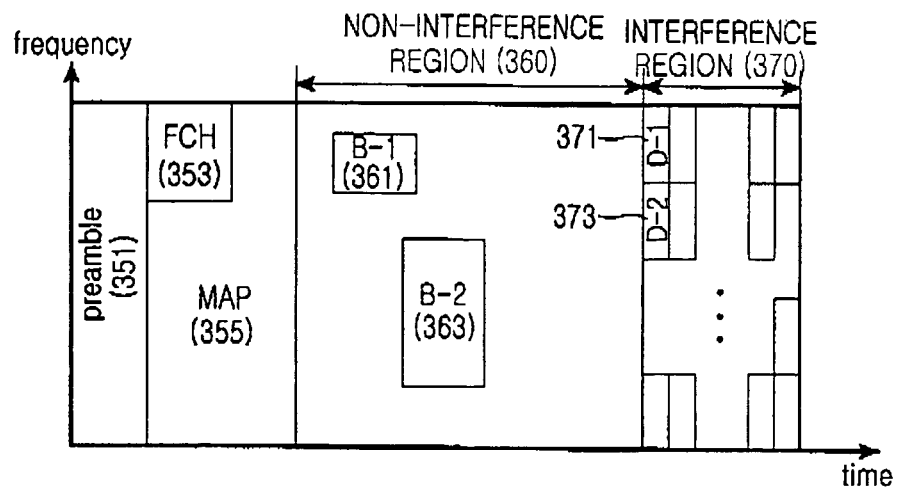

In other words, in all the frames of the multiple cells, since the non-interference regions 210 and the interference regions 220 are all divided in the rectangular form and the start positions 201 and the end positions 203 of the interference regions 220 are identical as shown in FIG. 2A, the interference regions 220 of all the frames are identical in size and position. In addition, in all frames of the multiple cells, since non-interference regions 250 and interference regions 260 are divided in a predetermined pattern and the start positions 251 and the end positions 253 of the interference regions 260 are identical as shown in FIG. 2B, the interference regions 260 of all the frames are identical in size and position. With reference to FIGS. 3A and 3B, a detailed description will now be made of a frame structure in a BWA communication system having a multi-cell structure according to the present invention.

FIGS. 3A and 3B illustrate frame structures in a BWA communication system having a multi-cell structure according to the present invention. Specifically, FIG. 3A illustrates a frame structure for a serving cell managed by a serving BS that provides a communication service to an MS in the BWA communication system, and FIG. 3B illustrates a frame structure of a neighbor cell from which the MS receives cell interference. Although data transmission regions of FIGS. 3A and 3B will be assumed to be divided into non-interference regions and interference regions in the rectangular form as shown in FIG. 2A, the data transmission regions of FIGS. 3A and 3B can also be divided according to a predetermined pattern as shown in FIG. 2B.

Referring to FIG. 3A, the frame for a serving cell in the communication system has a two-dimensional structure by a frequency region and a time region, and includes a preamble region 301, a Frame Control Header (FCH) region 303, a MAP message region 305 containing a DL-MAP message and a UL-MAP message, and data transmission regions 310 and 320.

The preamble region 301 is used for transmitting a synchronization signal, i.e. preamble sequence, for synchronization acquisition between a transmitter and a receiver, i.e. between a serving BS and an MS. The FCH region 303 is used for transmitting basic information on, for example, sub-channel, ranging and modulation scheme. The MAP message region 305 is used for transmitting a DL-MAP message and a UL-MAP message.

The MAP message region 305 includes information on the data transmission regions 310 and 320. The data transmission regions 310 and 320 are divided into a non-interference region 310 and an interference region 320. Resources of the non-interference region 310 are allocated to MSs located in the region where they receive no cell interference from a neighbor cell, for example, the center region of the serving cell, and resources of the interference region 320 are allocated to MSs located in the region where they receive cell interference from the neighbor cell, for example, the boundary region of the serving cell.

More specifically, the non-interference region 310 has an A-1 region 311 and an A-2 region 313 allocated to MSs located in the non-interference region, and allocation information of the A-1 region 311 and the A-2 region 313 is included in the MAP message region 305. Similarly, the interference region 320 has a C-1 region 321 and a C-2 region 323 allocated to MSs located in the interference region, and allocation information of the C-1 region 321 and the C-2 region 323 is included in the MAP message region 305.

As information on a start position and an end position of both the non-interference region 310 and the interference region 320 are included in the MAP message region 305 in the time region and the frequency region, position and size information of the non-interference region 310 and the interference region 320 is included in the MAP message region 305. Particularly, in the MAP message region 305, sizes and positions of not only the A-1 region 311 and the A-2 region 313 of the non-interference region 310 but also the C-1 region 321 and the C-2 region 323 of the interference region 320 are expressed in the time region and the frequency region using the start positions and the end positions, and as for the allocation information included in the MAP message region 305, the allocated regions, which are a multiple of a slot, are expressed with their positions and sizes. Herein, the slot indicates the minimum resource allocation unit composed of sub-channels and symbols in the time region and the frequency region.

The A-1 region 311 and the A-2 region 313 of the non-interference region 310 as well as the C-1 region 321 and the C-2 region 323 of the interference region 320 are allocated to MSs located in the non-interference region of the serving cell and MSs located in the interference region of the serving cell. That is, the A-1 region 311 is allocated to one MS located in the non-interference region, and the A-2 region 313 is allocated to another MS located in the non-interference region. Similarly, the C-1 region 321 is allocated to one MS located in the interference region, and the C-2 region 323 is allocated to another MS located in the interference region.

Therefore, if the MSs located in the serving cell detect, after receiving the MAP message, MAP information allocated to them while sequentially decoding the MAP information included in the received MAP message, they can determine positions of resources allocated to them using position information in the detected MAP information.

Referring to FIG. 3B, the frame for a neighbor cell of the communication system has the same structure as the frame for the serving cell of FIG. 3A. That is, the frame for the neighbor cell has a 2-dimensional structure by a frequency region and a time region, and includes a preamble region 351, an FCH region 353, a MAP message region 355 containing a DL-MAP message and a UL-MAP message, and data transmission regions 360 and 370.

The preamble region 351 is used for transmitting a synchronization signal, i.e. preamble sequence, for synchronization acquisition between a transmitter and a receiver, i.e. between a neighbor BS and an MS. The FCH region 353 is used for transmitting basic information on, for example, sub-channel, ranging and modulation scheme. The MAP message region 355 is used for transmitting a DL-MAP message and a UL-MAP message.

The MAP message region 355 includes information on the data transmission regions 360 and 370, which are divided into a non-interference region 360 and an interference region 370. Resources of the non-interference region 360 are allocated to MSs located in the region where they receive no cell interference from another neighbor cell, for example, the center region of the neighbor cell, and resources of the interference region 370 are allocated to MSs located in the region where they receive cell interference from another neighbor cell, for example, the boundary region of the neighbor cell.

More specifically, the non-interference region 360 has a B-1 region 361 and a B-2 region 363 allocated to MSs located in the non-interference region, and allocation information of the B-1 region 361 and the B-2 region 363 is included in the MAP message region 355. Similarly, the interference region 370 has a D-1 region 371 and a D-2 region 373 allocated to MSs located in the interference region, and allocation information of the D-1 region 371 and the D-2 region 373 is included in the MAP message region 355.

As information on a start position and an end position of both the non-interface region 360 and the interference region 370 are included in the MAP message region 355 in the time region and the frequency region, position and size information of the non-interference region 360 and the interference region 370 is included in the MAP message region 355. Particularly, in the MAP message region 355, sizes and positions of not only the B-1 region 361 and the B-2 region 363 of the non-interference region 360 but also the D-1 region 371 and the D-2 region 373 of the interference region 370 are expressed in the time region and the frequency region using the start positions and the end positions, and as for the allocation information included in the MAP message region 355, the allocated regions, which are a multiple of a slot, are expressed with their positions and sizes.

The B-1 region 361 and the B-2 region 363 of the non-interference region 360 as well as the D-1 region 371 and the D-2 region 373 of the interference region 370 are allocated to MSs located in the non-interference region of the neighbor cell and MSs located in the interference region of the neighbor cell. That is, the B-1 region 361 is allocated to one MS located in the non-interference region, and the B-2 region 363 is allocated to another MS located in the non-interference region. Similarly, the D-1 region 371 is allocated to one MS located in the interference region, and the D-2 region 373 is allocated to another MS located in the interference region.

Therefore, if the MSs located in the neighbor cell detect, after receiving the MAP message, MAP information allocated to them while sequentially decoding the MAP information included in the received MAP message, they can determine positions of resources allocated to them using position information in the detected MAP information.

In the frames for the serving cell and the neighbor cell, the interference regions 320 and 370 are divided as the same regions as described above. That is, the interference regions 320 and 370 of the serving cell frame and the neighbor cell frame have the same sizes and positions. More specifically, the interference regions 320 and 370 are defined by start positions and end positions of the regions of the frames, and in the frames, the start positions and the end positions of the interference regions 320 and 370 are identical. In addition, the interference regions 320 and 370 are composed of specific unit regions for resource allocation to MSs located in an interference region of the cell, for example, to MSs which are located in the cell boundary and receive cell interference from a neighbor cell, and the specific unit region is allocated to one MS located in an interference region in each cell. Further, MCS level and repetition for each of the specific unit regions are identical in both of the serving cell frame and the neighbor cell frame.

Therefore, when an MS located in the boundary region of the serving cell, i.e. in the interference region, is allocated the C-1 region 321 of the interference region 320 from the serving cell frame and receives data from the serving BS, the MS may receive cell interference from the neighbor cell. That is, the MS, as it is located in the interference region of the interference cell, may receive cell interference from the neighbor BS that transmits data through the D-1 region 371 of the interference region 370 in the neighbor cell frame. At this point, the MS located in the interference region of the serving cell can detect information included in the preamble region 351 of the neighbor cell frame, and obtain information on a resource allocation region of a cell interference signal from the neighbor cell, i.e. a position and size of the D-1 region 371, and information on permutation, scrambling, MCS level and repetition of the interference signal transmitted through the D-1 region 371, using the detected information.

That is, because the interference region 320 in the serving cell frame is identical to the interference region 370 in the neighbor cell frame as described above, an MS that is located in the interference region of the serving cell and receives data through the C-1 region 321 in the interference region 320 of the serving cell frame can obtain all information on the signal giving cell interference by the D-1 region 371 in the interference region 370 of the neighbor cell frame by detecting only the information included in the preamble region 351 of the neighbor cell frame. Therefore, the MS can simply remove the cell interference received from the neighbor cell without detecting the MAP information included in the MAP message region 355 of the neighbor cell frame.

Figure 4:
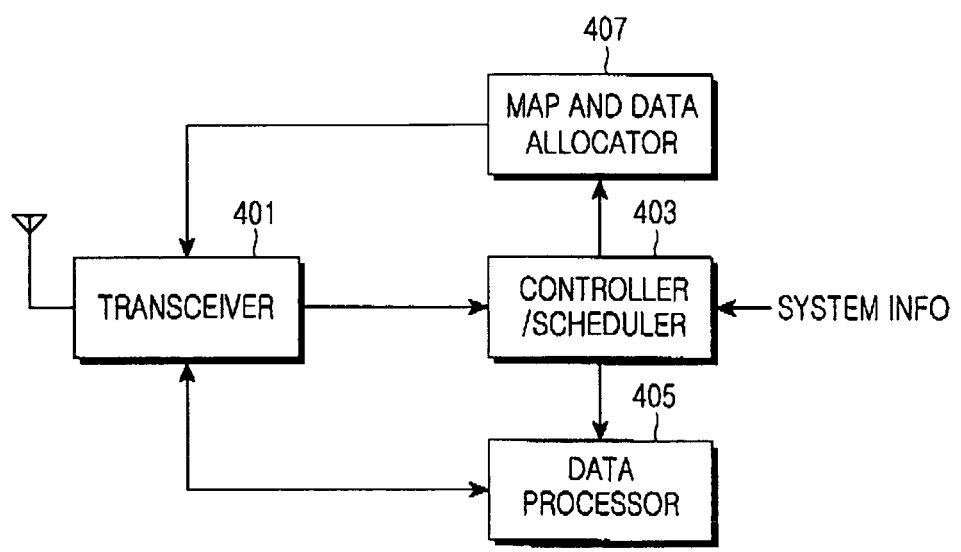
FIG. 4 illustrates a structure of a BS in a BWA communication system having a multi-cell structure according to the present invention.

FIG. 4 illustrates a structure of a BS in a BWA communication system having a multi-cell structure according to the present invention.

Referring to FIG. 4, the BS includes a transceiver 401 for exchanging data with MSs located in its cell, a data processor 405 for processing the data, a controller/scheduler 403 for controlling the overall operation of the BS depending on system information, and MS information and channel information received via the transceiver 401, and allocating resources to the MSs, and a MAP and data allocator 407 for allocating MAP information of the MSs and the data to be transmitted to the MSs according to the control and allocation information from the controller/scheduler 403.

The MAP and data allocator 407, once an ID of a cell managed by the BS is determined, divides a frame of the cell into regions, particularly divides a data transmission region into a non-interference region and an interference region. In addition, the MAP and data allocator 407 allocates corresponding resources to the MSs according to the control and allocation information from the controller/scheduler 403, and includes the allocated resource information in MAP information.

Figure 5:
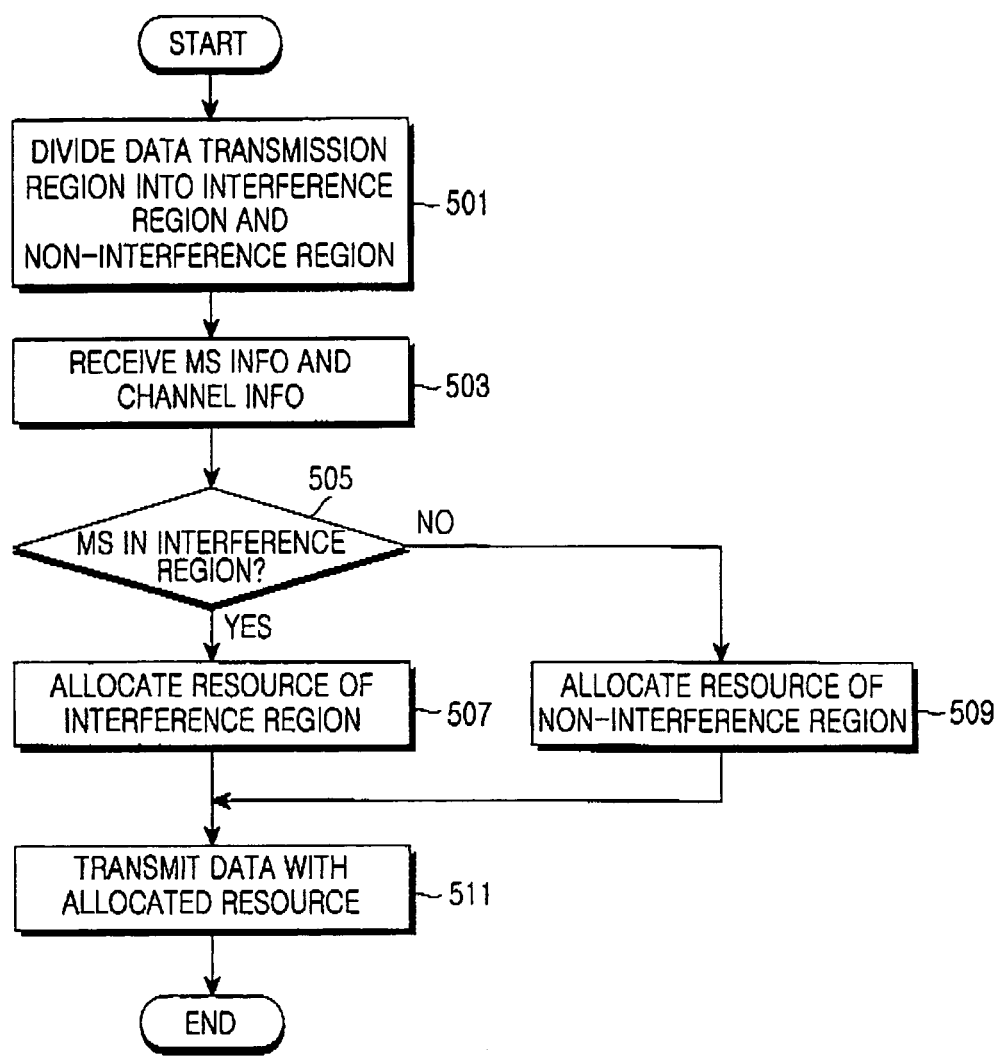
FIG. 5 is a flowchart illustrating an operation of a BS in a BWA communication system having a multi-cell structure according to an the present invention.

FIG. 5 is a flowchart illustrating an operation of a BS in a BWA communication system having a multi-cell structure according to the present invention.

Referring to FIG. 5, in step 501, the BS, once an ID of the BS cell is determined, divides a data transmission region for transmitting data to MSs located in the BS cell into a non-interference region and an interference region. That is, in step 501, the BS divides resources available for data transmission to MSs into resources to be allocated to MSs located in a non-interference region and resources to be allocated to MSs located in an interference region. Thereafter, in step 503, the BS receives feedback information, i.e. MS information and channel information, from the MSs located in the cell. In step 505, the BS determines from the received feedback information whether a corresponding MS is located in the interference region.

If it is determined in step 505 that the corresponding MS is located in the interference region, in other words, if the MS is located in the cell boundary and receives cell interference from a neighbor cell, the BS proceeds to step 507 where it allocates resources of the interference region. If it is determined in step 505 that the corresponding MS is located in the non-interference region, in other words, if the MS is located in the center region of the cell and receives no cell interference from the neighbor cell, the BS proceeds to step 509 where it allocates resources of the non-interference region. Thereafter, in step 511, the BS includes division information of the data transmission region, i.e. size and position information of the interference region and non-interference region, and resource allocation information in a MAP message, transmits the MAP message to the MS, and transmits data to the MS with the allocated resource.

Figure 6:
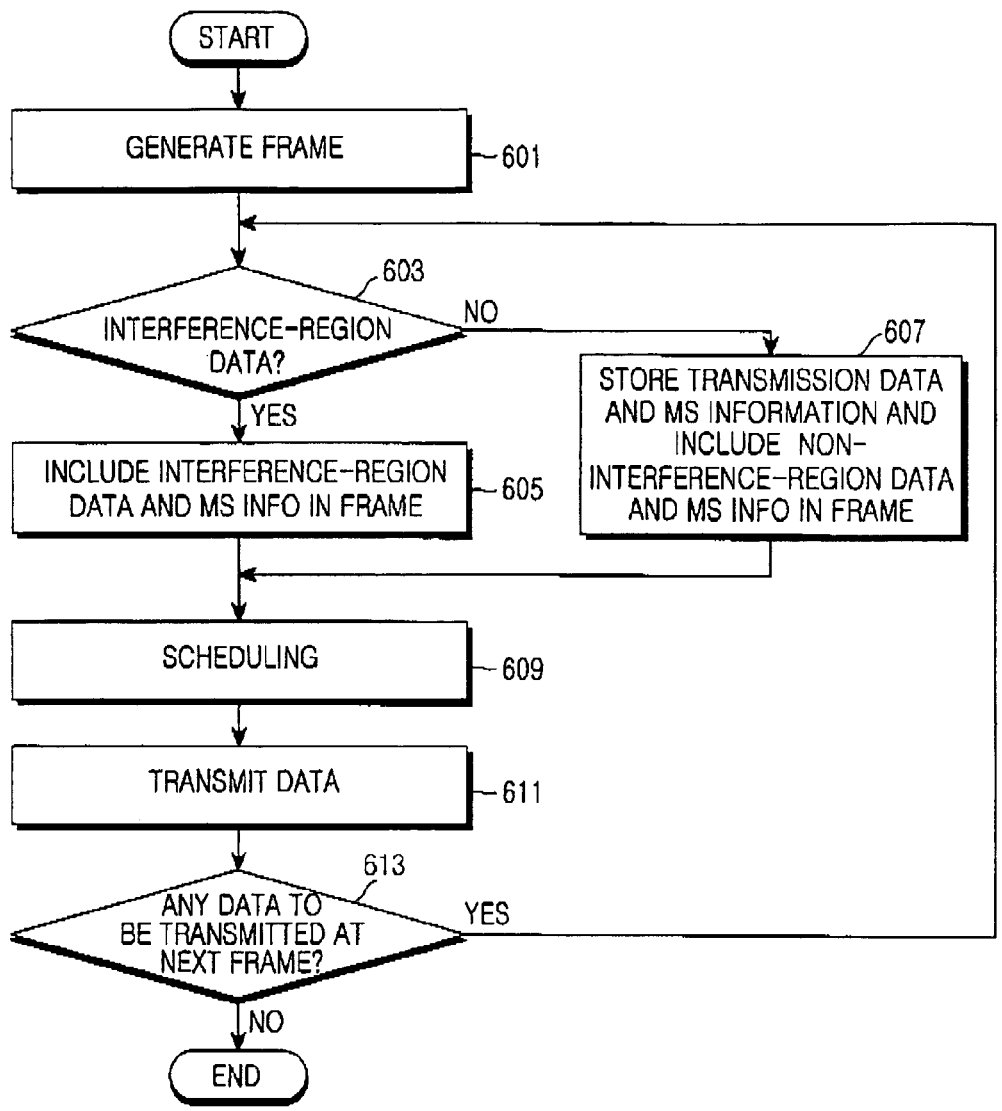
FIG. 6 is a flowchart illustrating a data transmission operation of a BS in a BWA communication system having a multi-cell structure according to the present invention.

FIG. 6 is a flowchart illustrating a data transmission operation of a BS in a BWA communication system having a multi-cell structure according to the present invention. It is assumed herein that the BS performs the data transmission operation after forming the frames whose data transmission regions are divided into non-interference regions and interference regions.

Referring to FIG. 6, in step 601, the BS generates a frame by dividing a data transmission region into a non-interference region and an interference region. In step 603, the BS determines whether the data to be transmitted to MSs located in a serving cell corresponds to the data to be transmitted to an MS located in an interference region or in a non-interference region. If it is determined in step 603 that the corresponding data corresponds to the data to be transmitted to the MS located in the interference region, the BS proceeds to step 605 where it includes the data to be transmitted to the MS located in the interference region in a region previously allocated in the interference region of the data transmission region in the generated frame, and also includes information on the corresponding MS that will receive the included data, in a MAP message region. Further, the BS includes allocation information of the region where the transmission data is included, in the MAP message region, and then proceeds to step 609.

However, if it is determined in step 603 that the transmission data corresponds to the data to be transmitted to the MS located in the non-interference region, the BS proceeds to step 607 where it includes the data to be transmitted to the MS located in the non-interference region in a region previously allocated in the non-interference region of the generated frame, and also includes information on the corresponding MS that will receive the included data, in the MAP message region. Further, the BS includes allocation information of the region where the transmission data is included, in the MAP message region, and then proceeds to step 609. In step 609, the BS performs scheduling and allocates resources to the MSs. In step 611, the BS transmits data to the MSs through the allocated resources. Thereafter, the BS determines in step 613 whether there is any data to transmit to the MSs, i.e. whether there is any data to transmit to the MSs through the next frame. If it is determined in step 613 that there is transmission data, the BS returns to step 603. However, if there is no transmission data, the BS ends the data transmission to the MSs.

Figure 7:
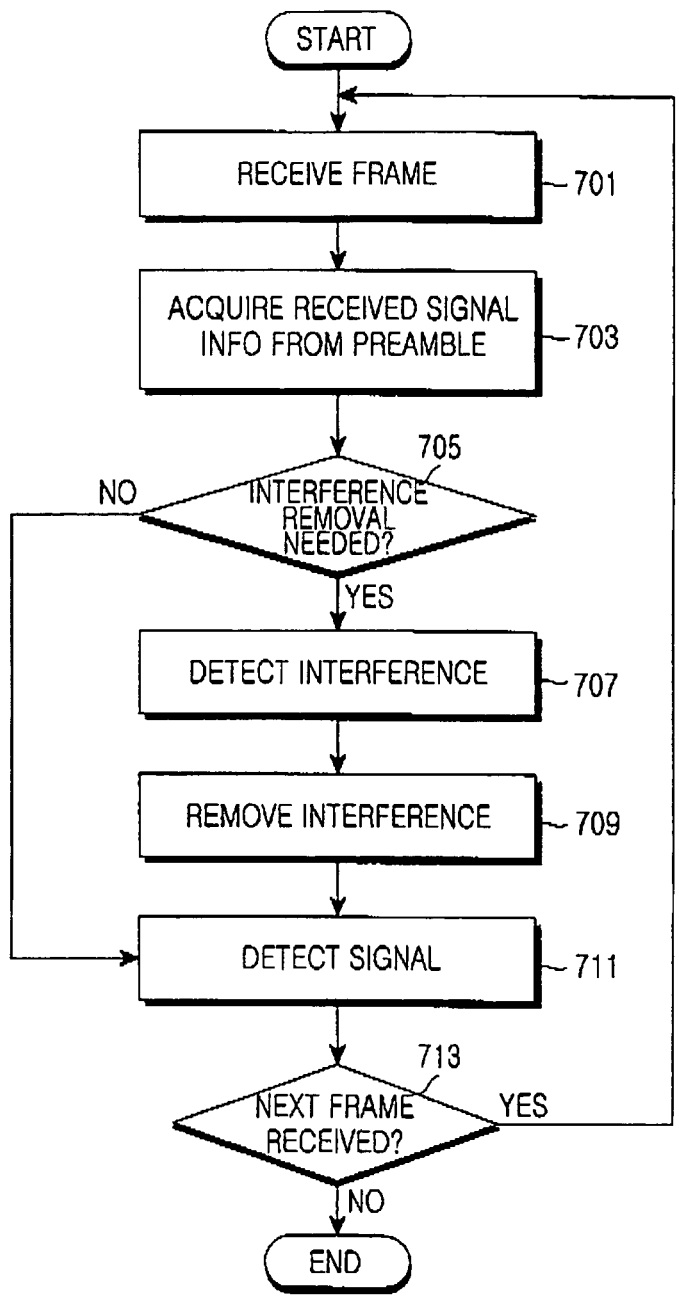
FIG. 7 is a flowchart illustrating a data reception operation of an MS in a BWA communication system having a multi-cell structure according to the present invention.

FIG. 7 is a flowchart illustrating a data reception operation of an MS in a BWA communication system having a multi-cell structure according to the present invention.

Referring to FIG. 7, in step 701, the MS receives a frame in which a data transmission region is divided into a non-interference region and an interference region. In step 703, the MS acquires permutation, scrambling, MCS level and repetition information of a received signal through a preamble region of the frame. Herein, the received signal includes not only the signal received from a serving BS that manages a cell in which the MS is currently located, but also the signal received from a neighbor BS that manages a neighbor cell adjacent to the serving cell, i.e. a cell interference signal. Because the interference region of the serving cell frame and the interference region of the neighbor cell frame are divided in the same manner as described above, the MS acquires permutation, scrambling, MCS level and repetition information of the interference signal, and position and size information of the interference region of the neighbor cell frame through the preamble region of the serving cell frame.

Thereafter, in step 705, the MS determines whether there is any interference signal received from the neighbor BS in the received signal, i.e. whether it should remove the interference signal, if any. If it is determined in step 705 that there is an interference signal, the MS proceeds to step 707 where it detects an interference signal received from the neighbor BS. Thereafter, in step 709, the MS removes the detected interference signal. In step 711, the MS detects a signal received from the serving BS, and receives the data that the serving BS transmits to the MS.

However, if it is determined in step 705 that there is no interference signal, the MS proceeds to step 711 where it detects a signal received from the serving BS and receives the data that the serving BS transmits to the MS. Thereafter, in step 713, the MS determines whether the next frame is received, i.e. whether there is more data transmitted from the serving BS. If it is determined that the next frame is received, the MS returns to step 701. However, if no frame is received, the MS ends the data reception operation.

Figure 8:
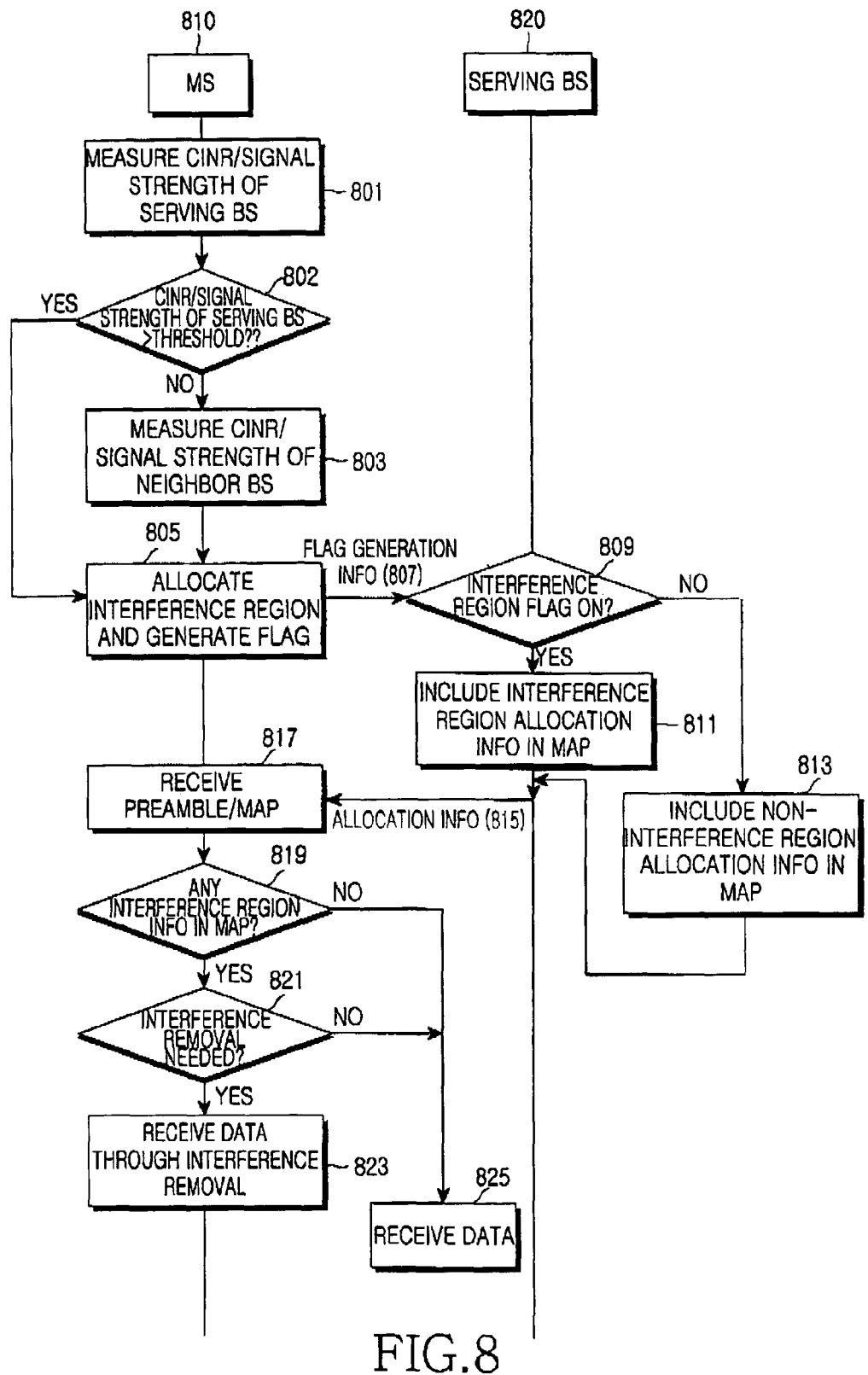
FIG. 8 is a flowchart illustrating signal exchange between a serving BS and an MS in a BWA communication system having a multi-cell structure according to the present invention.
Figure 9:
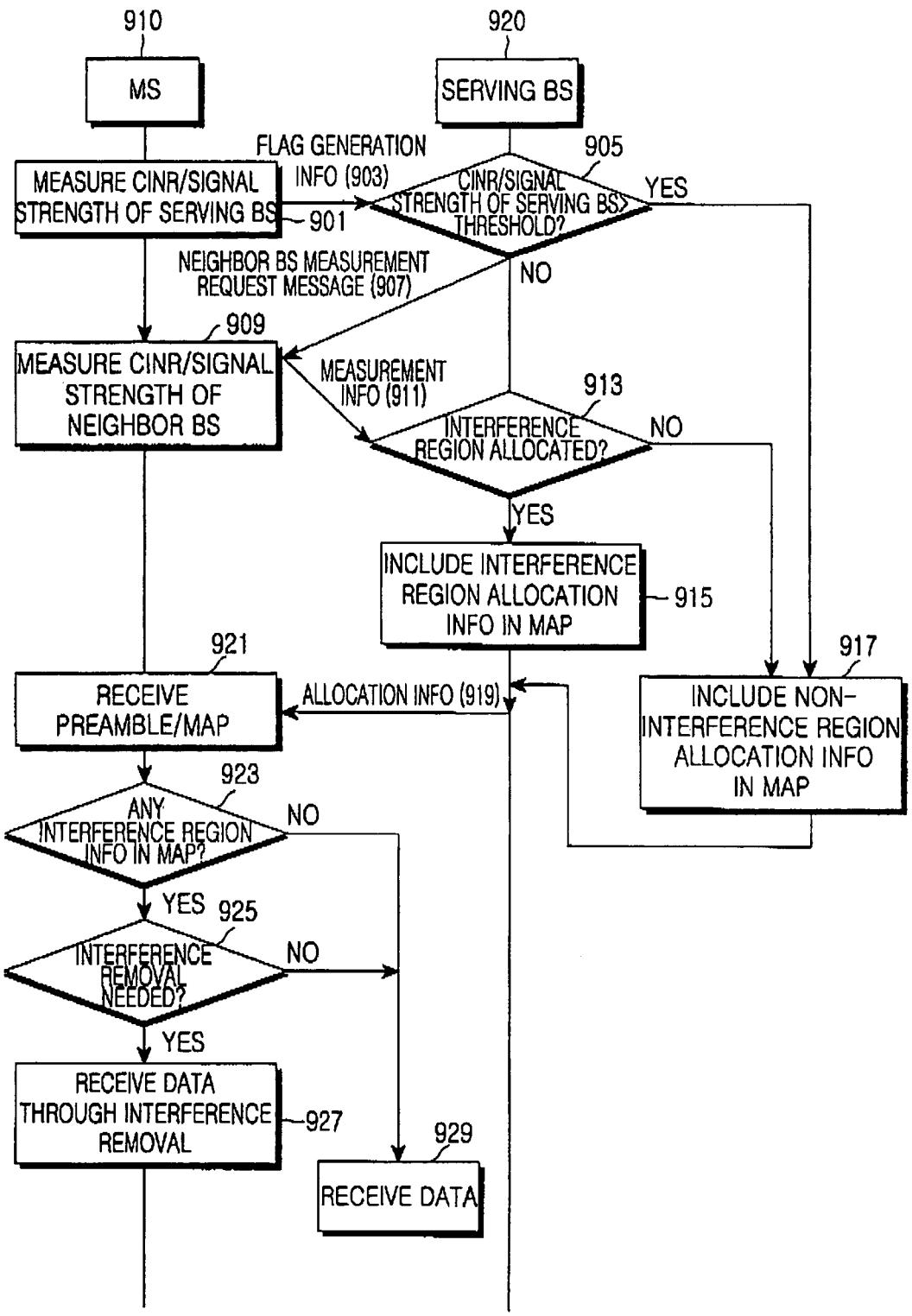
FIG. 9 illustrates another exemplary signal exchange process between a serving BS and an MS in a BWA communication system, in which the serving BS determines whether the MS is located in an interference region before the data exchange.

FIG. 8 is a flowchart illustrating signal exchange between a serving BS and an MS in a BWA communication system having a multi-cell structure according to the present invention. Herein, FIG. 8 illustrates a signal exchange process between a serving BS and an MS in a BWA communication system, in which the MS determines whether it is located in an interference region before the data exchange. FIG. 9 illustrates another signal exchange process between a serving BS and an MS in a BWA communication system according to the present invention, in which the serving BS determines whether the MS is located in an interference region before the data exchange.

Referring to FIG. 8, an MS 810 of the communication system measures a CINR, or strength, of a signal received from a serving BS 820 that manages its serving cell in step 801, and compares the measured CINR, or strength, of the received signal with a threshold previously set according to communication environment of the communication system in step 802. If the measured CINR, or strength, of the received signal is less than or equal to the threshold as a result of the comparison in step 802, the MS 810 measures a CINR, or strength, of a signal received from a neighbor BS that manages a neighbor cell adjacent to the serving cell in step 803. Herein, step 803 is optional.

Thereafter, the MS 810 generates an interference region allocation flag in a data transmission region of a serving cell frame according to the comparison result of step 802, in step 805, and transmits the generated flag information to the serving BS 820 in step 807. More specifically, if the measured CINR, or strength, of the received signal is less than or equal to the threshold as a result of the comparison in step 802, the MS 810 recognizes that it should be allocated resources of an interference region in a data transmission region of a previously generated frame, determining that it is located in an interference region, for example, boundary region of the serving cell, and thus receives cell interference from a neighbor cell. Therefore, the MS 810 generates flag information for turning on the interference region allocation flag of the frame, and transmits the generated flag information to the serving BS 820. If the flag information is assumed herein to have 1 bit, the flag information has a value of '0'.

However, if the measured CINR, or strength, of the received signal is greater than the threshold as a result of the comparison in step 802, the MS 810 recognizes that it should be allocated resources of a non-interference region in the data transmission region of the previously generated frame, determining that it is located in a non-interference region, for example, center region of the serving cell, and thus receives no cell interference from the neighbor cell. Accordingly, the MS 810 generates flag information for turning off the interference region allocation flag of the frame, and transmits the generated flag information to the serving BS 820. If the flag information is assumed herein to have 1 bit, the flag information has a value of '1'.

Upon receiving the flag information from the MS 810, the serving BS 820 determines in step 809 whether it will turn on the interference region flag according to the flag information. In other words, the serving BS 820 determines from the flag information whether the MS 810 is located in the interference region or the non-interference region. If it is determined in step 809 that the MS 810 is located in the interference region, the serving BS 820 allocates resources of the interference region in the data transmission region of the generated frame to the MS 810, and includes the interference region allocation information for the MS 810 in a MAP message region of the frame in step 811.

However, if it is determined in step 809 that the MS 810 is located in the non-interference region, the serving BS 820 allocates resources of the non-interference region in the data transmission region of the generated frame to the MS 810, and includes the non-interference region allocation information for the MS 810 in the MAP message region of the frame in step 813. After allocating the resources to the MS 810 and including the allocation information in the MAP message region, the serving BS 820 transmits the frame including the allocation information to the MS 810 in step 815.

Upon receiving the frame including the allocation information from the serving BS 820, the MS 810 detects and receives information included in the preamble region and the MAP message region of the received frame in step 817, and determines in step 819 whether there is any information in the interference region in the data transmission of the frame, based on the detected information included in the received MAP message region. That is, the MS 810 determines whether there is any signal received through the interference region in the data transmission region of the frame. Herein, the received signal, as described above, includes not only the signal received from the serving BS 820, but also the signal received from a neighbor BS that manages a neighbor cell adjacent to the serving cell, i.e. a cell interference signal. In addition, because the interference region of the serving cell frame and the interference region of the neighbor cell frame are divided in the same manner, the MS 810 acquires permutation, scrambling, MCS level and repetition information of the interference signal, and position and size information of the interference region of the neighbor cell frame through the preamble region of the serving cell frame.

If it is determined in step 819 that there is information in the interference region, the MS 810 determines in step 821 whether to perform interference removal. If the MS 810 determines to perform interference removal in step 821, it receives data from the serving BS 820 through interference removal in step 823. Herein, step 821 is optional. If it is determined in step 819 that there is no information in the interference region, the MS 810 receives data from the serving BS 820 without interference removal in step 825. In addition, if the MS 810 determines not to perform interference removal in step 821, it receives data from the serving BS 820 without interference removal in step 825.

FIG. 9 is a flowchart illustrating signal exchange between a serving BS and an MS in a BWA communication system having a multi-cell structure according to the present invention. As described above, FIG. 9 illustrates another signal exchange process between a serving BS and an MS in a BWA communication system according to the present invention, in which the serving BS determines whether the MS is located in an interference region before the data exchange.

Referring to FIG. 9, an MS 910 of the communication system measures a CINR, or strength, of a signal received from a serving BS 920 that manages its serving cell in step 901, and transmits measurement information of the measured CINR, or strength, of the received signal to the serving BS 920 in step 903. Upon receiving the measurement information, the serving BS 920 compares the measured CINR, or strength, of the received signal, transmitted by the MS 910, with a threshold previously set according to communication environment of the communication system in step 905.

If the measured CINR, or strength, of the received signal is less than or equal to the threshold as a result of the comparison in step 905, the serving BS 920 transmits to the MS 910 a neighbor BS measurement request message for requesting measurement of a CINR, or strength, of a signal received from a neighbor BS that manages a neighbor cell adjacent to the serving cell in step 907. Upon receiving the neighbor BS measurement request message from the serving BS 920, the MS 910 measures a CINR, or strength, of a signal received from the neighbor BS in response to the request in step 909. Thereafter, the MS 910 transmits measurement information of the measured CINR, or strength, of the received signal to the serving BS 920 in step 911. Based on the measurement information received from the MS 910, the serving BS 920 determines in step 913 whether it will allocate resources for the MS 910 in an interference region or a non-interference region of a data transmission region of a frame. That is, the serving BS 920 recognizes a cell interference size of the MS 910 from the measurement information of the CINR, or strength, of the received signal, measured and transmitted by the MS 910, and determines whether to allocate resources for the MS 910 in the interference region or the non-interference region according to the recognized cell interference size. Herein, steps 907 to 913 are optional.

According to the comparison result in step 905, the serving BS 920 determines whether it will allocate resources for the MS 910 in the interference region or the non-interference region in the data transmission region of the serving cell frame. More specifically, if the measured CINR, or strength, of the received signal is less than or equal to the threshold as a result of the comparison in step 905, the serving BS 920 recognizes that it should allocate resources in the interference region in the data transmission region of the previously generated frame to the MS 910, determining that the MS 910 is located in the interference region, i.e. boundary region of the serving cell, and thus receives cell interference from the neighbor cell.

However, if the measured CINR, or strength, of the received signal is greater than the threshold as a result of the comparison in step 905, the serving BS 920 recognizes that it should allocate resources in the non-interference region in the data transmission region of the previously generated frame to the MS 910, determining that the MS 910 is located in the non-interference region, i.e. center region of the serving cell, and thus receives no cell interference from the neighbor cell.

If it is determined in step 913 that the MS 910 is located in the interference region, the serving BS 920 allocates resources of the interference region in the data transmission region of the generated frame to the MS 910, and includes the interference region allocation information for the MS 910 in a MAP message region of the frame in step 915. If it is determined in step 913 that the MS 910 is located in the non-interference region, the serving BS 920 allocates resources of the non-interference region in the data transmission region of the generated frame to the MS 910, and includes the non-interference region allocation information for the MS 910 in the MAP message region of the frame in step 917. After allocating the resources to the MS 910 and including the allocation information in the MAP message region, the serving BS 920 transmits the frame including the allocation information to the MS 910 in step 919.

Upon receiving the frame including the allocation information from the serving BS 920, the MS 910 detects and receives information included in the preamble region and the MAP message region of the received frame in step 921, and determines in step 923 whether there is any information in the interference region in the data transmission of the frame, based on the detected information included in the received MAP message region. That is, the MS 910 determines whether there is any signal received through the interference region in the data transmission region of the frame. Herein, the received signal, as described above, includes not only the signal received from the serving BS 920, but also the signal received from a neighbor BS that manages a neighbor cell adjacent to the serving cell, i.e. a cell interference signal. In addition, because the interference region of the serving cell frame and the interference region of the neighbor cell frame are divided in the same manner, the MS 910 acquires permutation, scrambling, MCS level and repetition information of the interference signal, and position and size information of the interference region of the neighbor cell frame through the preamble region of the serving cell frame.

If it is determined in step 923 that there is information in the interference region, the MS 910 determines in step 925 whether to perform interference removal. If the MS 910 determines to perform interference removal in step 925, it receives data from the serving BS 920 through interference removal in step 927. Herein, step 925 is optional. If it is determined in step 923 that there is no information in the interference region, the MS 910 receives data from the serving BS 920 without interference removal in step 929. In addition, if the MS 910 determines not to perform interference removal in step 925, it receives data from the serving BS 920 without interference removal in step 929.

As can be understood from the foregoing description, the communication system according to the present invention divides a data transmission region into an interference region and a non-interference region, and exchanges data with MSs with one of the interference region and the non-interference region according to feedback information provided from the MSs, so MSs receiving cell interference from the neighbor cell can simply remove the cell interference. As a result, a received CINR of the MS increases, thereby reducing the system load and thus improving the system performance.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for transmitting data in a communication system, the method comprising:
    if data to be transmitted to at least one Mobile Station (MS) is generated, dividing a data transmission region of a frame of the generated data to be transmitted into a first region and a second region;
    determining, a region where an MS that receives the generated data among the at least one MS is located based on feedback information received by the at least one MS;
    allocating resources of the first region if the MS that receives the generated data is located in a non-interference region, and allocating resources of the second region if the MS that receives the generated data is located in an interference region according to the determination result;
    including the generated data in a region where the resources are allocated;
    including, in a MAP message region, resource allocation information representing the region where the generated data is included and information on the MS that receives the data included in the resource-allocated region; and
    transmitting, to the MS, the frame including the region in which the generated data is included, and the MAP message region,
    wherein the second region divided from a data transmission region of a neighbor cell frame and the second region divided from the data transmission region of a serving cell frame have the same size and position, and
    wherein the second region divided from the data transmission region of the neighbor cell frame and the second region divided from the data transmission region of the serving cell frame are divided into a plurality of unit regions having the same size in a frequency domain and a time domain.

2. The method of claim 1, wherein the allocation of the resources of the second region comprises dividing the second region into the plurality of unit regions, and allocating a specific unit region among the divided unit regions to the MS that receives the data.

3. The method of claim 1, wherein the plurality of unit regions have an identical Modulation and Coding Scheme (MCS) level.

4. The method of claim 1, wherein the MAP message region comprises size and position information of the first region and the second region.

5. The method of claim 4, wherein the size and position information comprises start and end positions of the first region and the second region.

6. The method of claim 1, wherein determining the region where the MS that receives the data is located further comprises comparing a Carrier-to-Interference and Noise Ratio (CINR), or strength, of a received signal, included in the feedback information, with a threshold.

7. The method of claim 6, wherein the allocation of the resources of a data transmission region divided into the first region and the second region to the MS that receive the data comprises:
    allocating resources of the first region to the MS that receive the data, if the CINR, or strength, of the received signal is greater than the threshold; and
    allocating resources of the second region to the MS that receives the data, if the CINR, or strength, of the received signal is less than or equal to the threshold.

8. A method for receiving data in a communication system, the method comprising:
    receiving, from a Base Station (BS) of a serving cell frame where a Mobile Station (MS) is currently located, a frame having a data transmission region that is divided into a first region and a second region;
    detecting information included in a preamble region and a MAP message region of the received frame, and determining a region where the MS is located depending on the detected information; and
    detecting data included in the first region if the MS that receives the data is located in a non-interference region, and detecting data included in the second region if the MS that receives the data is located in an interference region according to the determination result,
    wherein the second region divided from a data transmission region of a neighbor cell frame and the second region divided from a data transmission region of a serving cell frame have the same size and position, and
    wherein the second region divided from the data transmission region of the neighbor cell frame and the second region divided from the data transmission region of the serving cell frame are divided into a plurality of unit regions having the same size in a frequency domain and a time domain.

9. The method of claim 8, wherein the detection of data included in the second region comprises detecting data included in a specific unit region in the second region divided into the plurality of unit regions according to information included in the MAP message region.

10. The method of claim 8, wherein the plurality of unit regions have the same Modulation and Coding Scheme (MCS) level.

11. The method of claim 8, wherein the detection of data included in the second region comprises detecting a signal that a BS of the neighbor cell has transmitted, from a signal received through the second region divided from the data transmission region of the serving cell frame, removing the detected signal, and then detecting a signal that the BS of the serving cell has transmitted.

12. The method of claim 11, wherein the detection of the signal that the BS of the neighbor cell has transmitted comprises detecting the signal using information included in a preamble region of the neighbor cell frame.

13. The method of claim 8, wherein the MAP message region comprises size and position information of the first region and the second region.

14. The method of claim 13, wherein the size and position information comprises start and end positions of the first region and the second region.

15. The method of claim 8, wherein determining the region where the MS is located comprises comparing a Carrier-to-Interference and Noise Ratio (CINR), or strength, of a received signal, measured while receiving the frame from the BS, with a threshold.

16. The method of claim 15, wherein determining the region where the MS is located comprises:
  determining that the MS is located in the non-interference region, if the CINR, or strength, of the received signal is greater than the threshold; and
  determining that the MS is located in the interference region, if the CINR, or strength, of the received signal is less than or equal to the threshold.

17. The method of claim 16, wherein receiving the frame comprises generating flag information according to the determination result of the region where the MS is located, transmitting the generated flag information to the BS, and receiving a frame generated according to the flag information transmitted to the BS.

18. The method of claim 17, wherein receiving the frame comprises:
  turning on a flag of the first region if the CINR, or strength, of the received signal is greater than the threshold;
  turning on a flag of the second region if the CINR, or strength, of the received signal is less than or equal to the threshold; and
  allocating resources of the first region and the second region.

19. An apparatus for transmitting data by a Base Station (BS) in a communication system, the system comprising:
  a controller for determining, when data to be transmitted to at least one Mobile Station (MS) is generated, a region where an MS that receives the generated data among the at least one MS is located based on feedback information received by the at least one MS,
  a MAP and data allocator for allocating resources of a data transmission region divided into a first region and a second region to the MS that receives the data according to the determination result, including the generated data in a region where the resources are allocated, including, in a MAP message region, resource allocation information representing the region where the generated data is included and information on the MS that receives the data included in the resource-allocated region, and transmitting, to the MS, a frame including the region in which the generated data is included, and the MAP message region; and
  wherein the second region divided from the data transmission region of a neighbor cell frame and the second region divided from the data transmission region of a serving cell frame have the same size and position, and
  wherein the second region divided from the data transmission region of the neighbor cell frame and the second region divided from the data transmission region of the serving cell frame are divided into a plurality of unit regions having the same size in a frequency domain and a time domain.

20. The apparatus of claim 19, wherein the MAP and data allocator allocate resources of the first region if the MS that receives the data is located in a non-interference region, and allocates resources of the second region if the MS that receives the data is located in an interference region.

21. The apparatus of claim 20, wherein the MAP and data allocator divides the second region into the plurality of unit regions, and allocates a specific unit region among the divided unit regions to the MS that receives the data.

22. The apparatus of claim 19, wherein the plurality of unit regions have the same Modulation and Coding Scheme (MCS) level.

23. The apparatus of claim 19, wherein the MAP message region comprises size and position information of the first and second regions.

24. The apparatus of claim 23, wherein the size and position information comprises start and end positions of the first region and the second region.

25. The apparatus of claim 19, wherein the MAP and data allocator compares a Carrier-to-Interference and Noise Ratio (CINR), or strength, of a received signal, included in the feedback information, with a threshold.

26. The apparatus of claim 25, wherein the MAP and data allocator allocates resources of the first region to the MS that receives the data, if the CINR, or strength, of the received signal is greater than the threshold; and allocates resources of the second region to the MS that receives the data, if the CINR, or strength, of the received signal is less than or equal to the threshold.

27. An apparatus for receiving data by a Mobile Station (MS) in a communication system, the apparatus comprising:
  a receiver for receiving, from a Base Station (BS) of a serving cell frame where the MS is currently located, a frame having a data transmission region that is divided into a first region and a second region; and
  a controller for detecting information included in a preamble region and a MAP message region of the received frame, and determining a region where the MS is located depending on the detected information and detecting data included in the first region if the MS that receives the data is located in a non-interference region, and detecting data included in the second region if the MS that receives the data is located in an interference region according to the determination result,
  wherein the second region divided from a data transmission region of a neighbor cell frame and the second region divided from a data transmission region of the serving cell frame have the same size and position, and
  wherein the second region divided from the data transmission region of the neighbor cell frame and the second region divided from the data transmission region of the serving cell frame are divided into a plurality of unit regions having the same size in a frequency domain and a time domain.

28. The apparatus of claim 27, wherein the plurality of unit regions have the same Modulation and Coding Scheme (MCS) level.

29. The apparatus of claim 27, wherein the MAP message region comprises size and position information of the first and second regions.

30. The apparatus of claim 29, wherein the size and position information comprises start and end positions of the first region and the second region.

31. The apparatus of claim 27, wherein the controller detects data included in the first region if the MS is located in the non-interference region; and detects data included in the second region if the MS is located in the interference region.

32. The apparatus of claim 31, wherein the controller detects data included in a specific unit region in the second region divided into the plurality of unit regions according to information included in the MAP message region.

33. The apparatus of claim 27, wherein the controller detects a signal that the BS of the neighbor cell frame has transmitted, from a signal received through the second region divided from the data transmission region of the serving cell frame, removes the detected signal, and then detects a signal that the BS of the serving cell has transmitted.

34. The apparatus of claim 33, wherein the controller detects the signal that the BS of the neighbor cell frame has transmitted, using information included in the preamble region of the neighbor cell frame.

35. The apparatus of claim 27, wherein the controller determines the region where the MS is located, by comparing a Carrier-to-Interference and Noise Ratio (CINR), or strength, of a received signal, measured while receiving the frame from the BS, with a threshold.

36. The apparatus of claim 35, wherein the controller determines that the MS is located in the non-interference region, if the CINR, or strength, of the received signal is greater than the threshold; and determines that the MS is located in the interference region, if the CINR, or strength, of the received signal is less than or equal to the threshold.

37. The apparatus of claim 36, wherein the controller generates flag information according to the determination result of the region where the MS is located, transmits the generated flag information to the BS, and receives a frame generated according to the flag information transmitted to the BS.

38. The apparatus of claim 37, wherein the controller turns on a flag of the first region if the CINR, or strength, of the received signal is greater than the threshold, turns on a flag of the second region if the CINR, or strength, if the received signal is less than or equal to the threshold, and allocates resources of the first region and the second region.

* * * * *